Aug. 5, 1958
G. STAVIS
2,846,677
OMNI-DIRECTIONAL BEACON SYSTEM
Filed Dec. 31, 1953
4 Sheets-Sheet 1
*Fig. 1A*
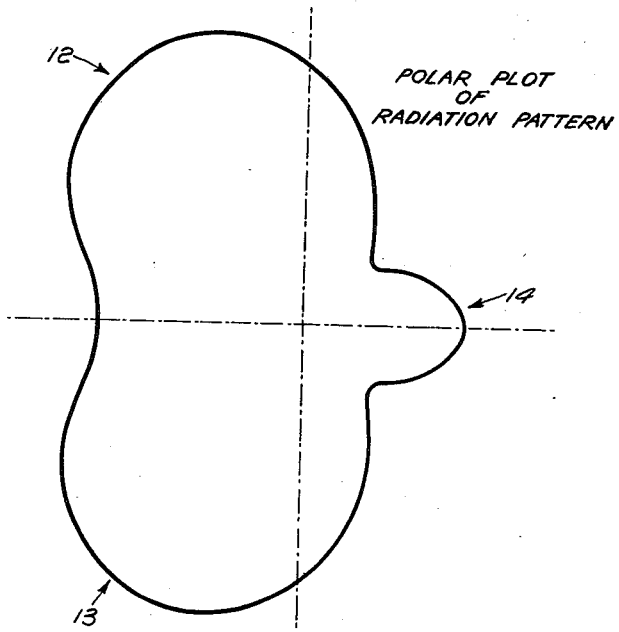
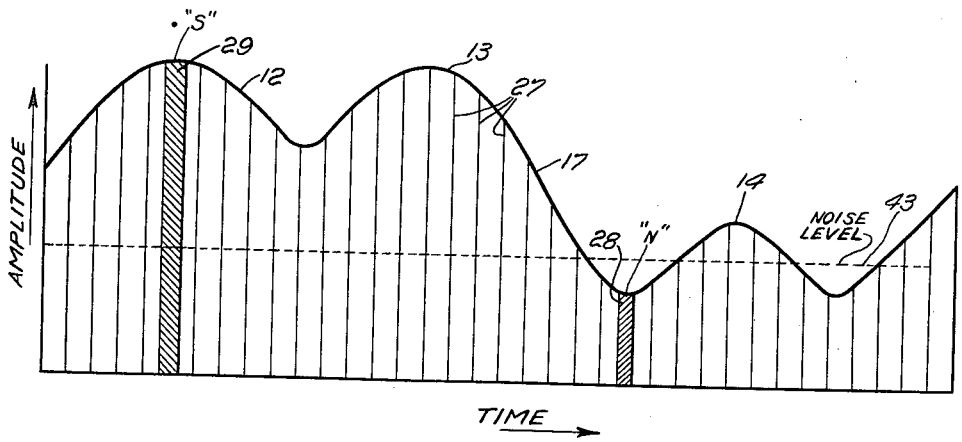
INVENTOR
GUS STAVIS
BY Ernest Fanwick
ATTORNEY

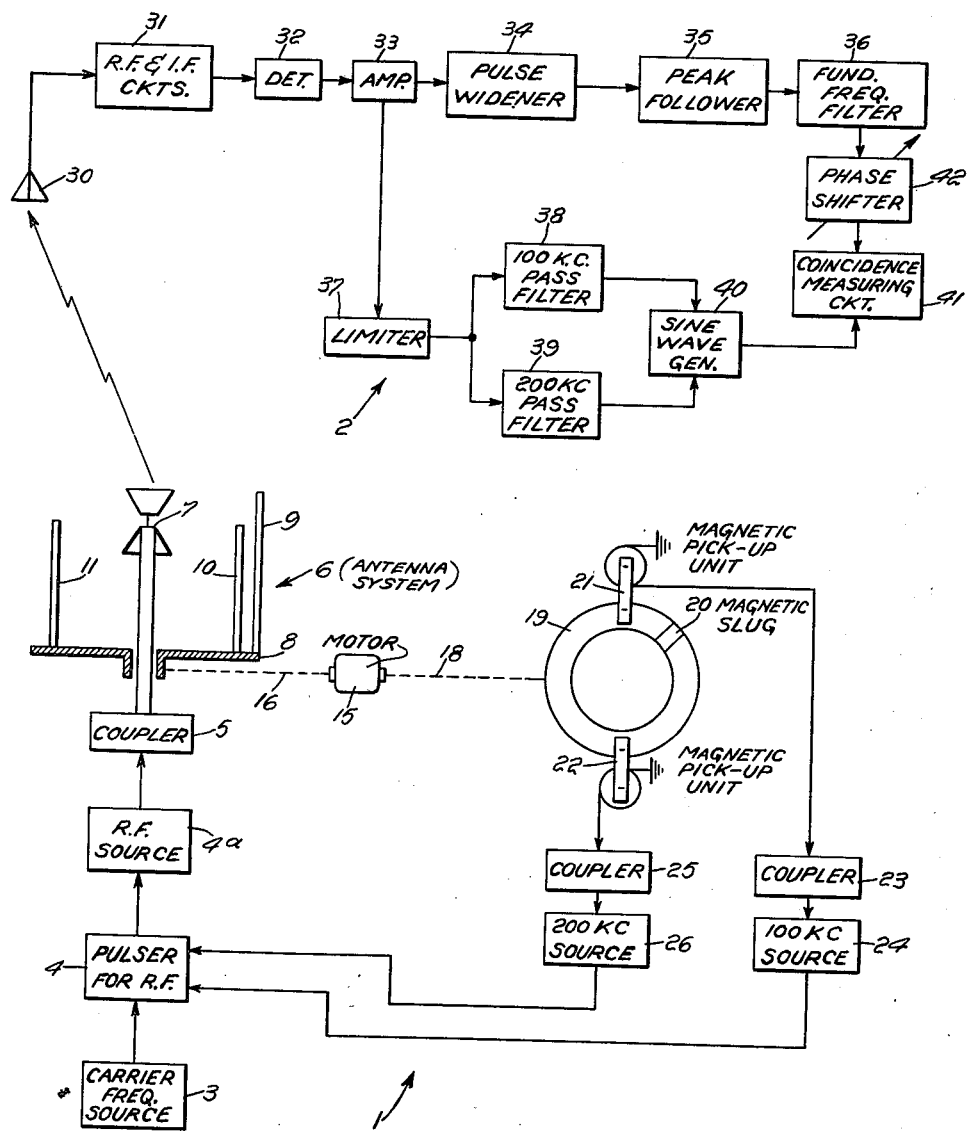

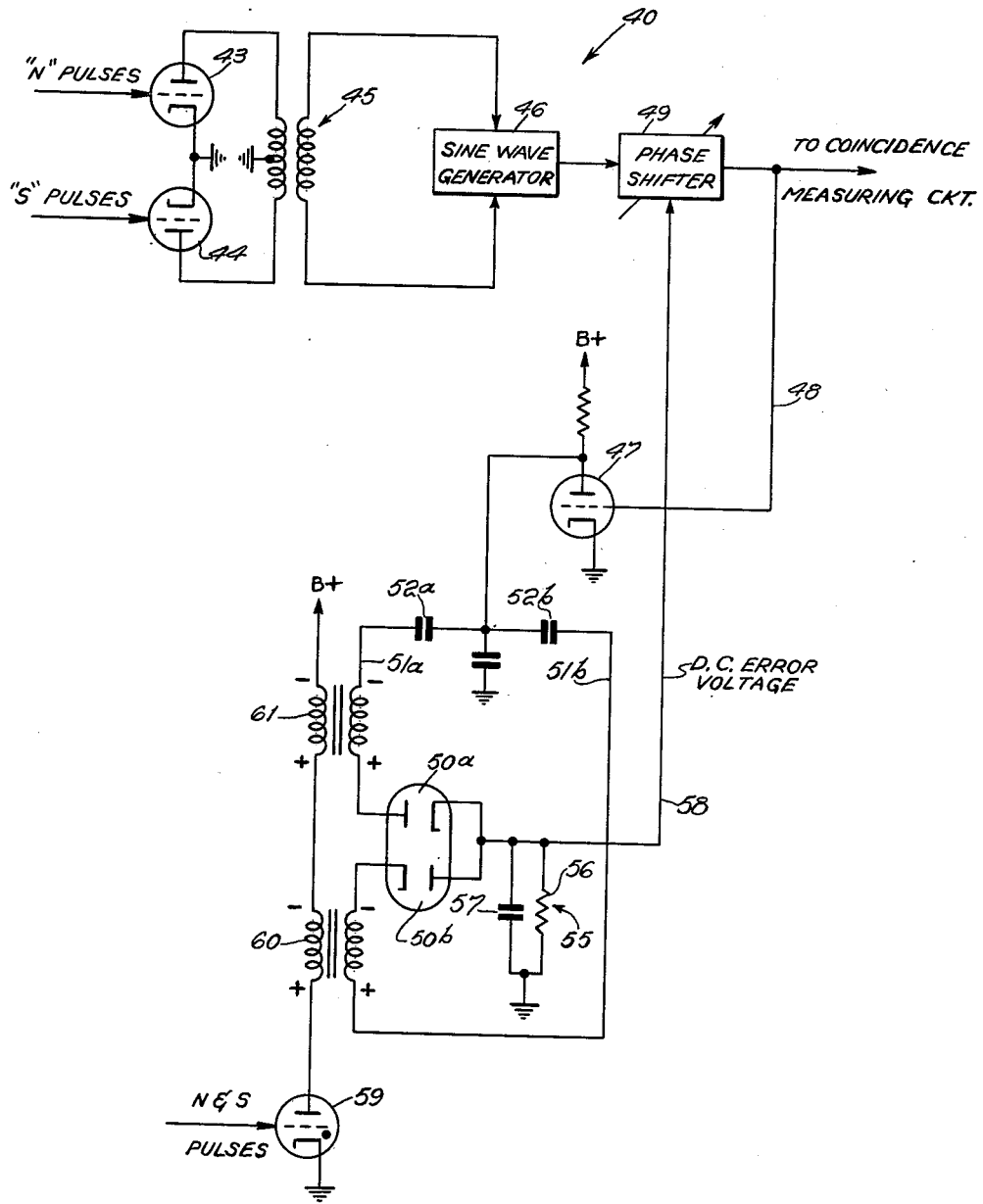

Aug. 5, 1958
G. STAVIS
2,846,677
OMNI-DIRECTIONAL BEACON SYSTEM
Filed Dec. 31, 1953
4 Sheets-Sheet 4
*Fig. 4*
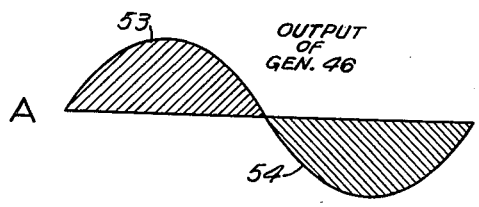
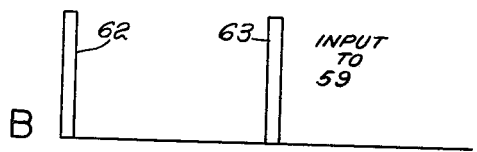
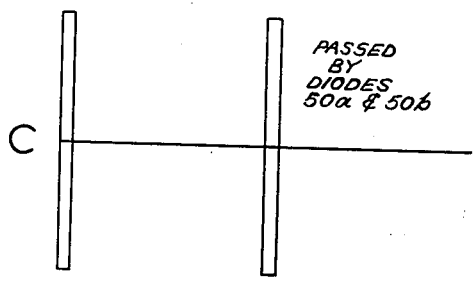
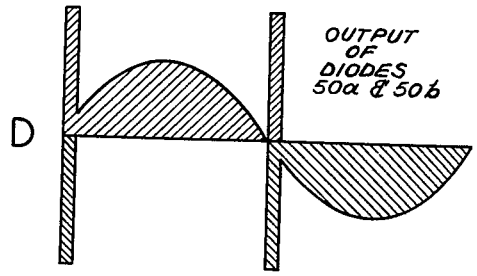
*Fig. 5*
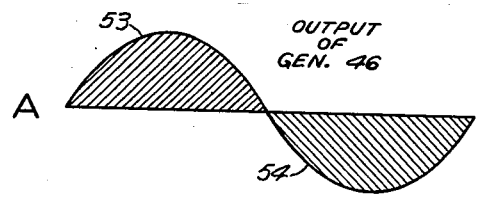
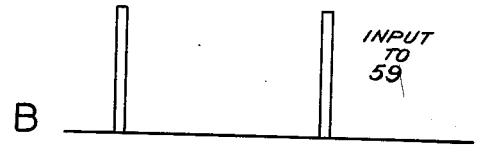
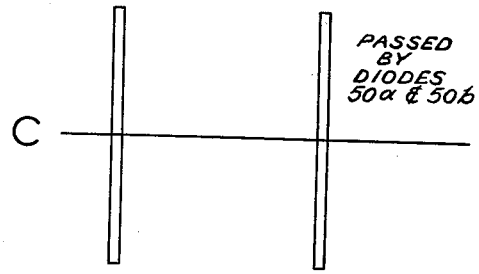
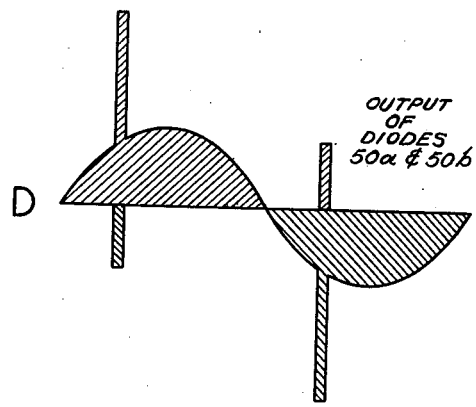
INVENTOR
GUS STAVIS
BY Ernest Fanwick
ATTORNEY

United States Patent Office 2,846,677
Patented Aug. 5, 1958

2,846,677

OMNI-DIRECTIONAL BEACON SYSTEM

Gus Stavis, Ossining, N. Y., assignor to International Telephone and Telegraph Corporation, Nutley, N. J., a corporation of Maryland Application December 31, 1953, Serial No. 401,625

12 Claims. (Cl. 343—106)

This invention relates to omni-directional beacon systems and more particularly to omni-directional radio range systems of the phase comparison type.

Omni-directional radio beacon systems for use in aerial navigation provide means for an aircraft to determine its bearing to the beacon from any direction and so are more flexible than beacons of the fixed course type. One type of omni-directional beacon generally favored is the so-called phase comparison type. In these systems heretofore employed, a directive radio pattern is rotated at a given rate so that at a remote receiving point a sinusoidal amplitude variation is produced having a fundamental frequency component determined by the rate of rotation. The wave produced by this rotation may be referred to as the bearing envelope wave or the bearing information wave. In order for the aircraft to determine its azimuth to the beacon it is also necessary to transmit a reference signal having a "fixed in phase" characteristic relative to the bearing information wave. The phase relation of the reference signal and the bearing information wave is dependent upon the angular position of the remote receiving point with respect to the point of origin of the beacon radiation. The bearing and reference signals are so related that in a predetermined direction, for example north, the two signals are cophasal. Thus the bearing of a craft with respect to the beacon can readily be obtained by making a phase comparison of these two signals.

Heretofore it has been found extremely advantageous to utilize pulse modulation techniques to transmit the bearing and reference signals. The bearing signal pulses are amplitude modulated with at least one sinusoidal characteristic by the antenna pattern of the beacon, and the receiver reconstructs the envelope wave from received pulses. The reference signal is transmitted as an omni-directional pulse which is detected in the receiver and compared in phase (or time position) with the reconstructed envelope wave to yield the azimuth reading. In omni-directional beacon systems of the phase comparison type, transmitting a rotating amplitude variation pattern which does not reduce to zero at any point in its rotation and in which a reference pulse is transmitted omni-directionally each time the beacon radiation pattern passes through a given reference direction, such as "north," there is no difficulty in synchronizing a local oscillator in the receiver with the received reference pulse or deriving a reference wave from the received reference pulse as long as the noise level is below the signal level of the reference pulse. However in many situations the average noise level will be insufficient to mask the bearing signal and yet because the receiver may be located in the direction having a minimum amplitude level it will fail to detect the reference pulse.

One of the objects of this invention therefore is to provide an omni-directional beacon system capable of operating in relatively high signal-to-noise ratios.

Another object of this invention is to provide an omni-range beacon system capable of comparing one or more reference signals with the same bearing signal.

A further object of this invention is to provide an omnirange beacon system in which a plurality of reference signals are transmitted for comparison with a single reference wave and in which a receiver is captable of utilizing one or more of the reference pulses for comparison with the bearing signal to obtain an indication of its azimuth.

A feature of this invention is the transmission of a rotating bearing signal having at least one sinusoidal characteristic along with a pair of reference signal pulses. The first reference pulse is transmitted omni-directionally each time the rotating pattern is in a predetermined direction. The second reference pulse is transmitted when the bearing signal is opposite from the predetermined direction. Thus with the 180° spacing of the reference pulses one of the reference signals will be at a relatively high amplitude level when the other reference pulse is at a relatively low amplitude level relative to the rotating directional pattern. The receiver detects either one or both of the reference signals which are then utilized to synchronize a reference wave oscillator whose output can be compared in phase with the envelope wave of the bearing signal to obtain the azimuth of the receiver relative to the beacon transmitter.

The above-mentioned and other features and objects of this invention will become more apparent by reference to the following description taken in conjunction with the accompanying drawings, in which:

Fig. 1A is a polar coordinate graphic illustration of the radiation pattern of the beacon transmitter of this invention;

Fig. 1B is a graphic illustration of the amplitude of the radiations versus time received by a receiver;

Fig. 2 is a diagram in block form of one embodiment of an omni-directional beacon system in accordance with the principles of this invention;

Fig. 3 is a schematic diagram partly in block form of the reference wave generator portion of the receiver for use in the beacon system of this invention; and Figs. 4 and 5 are graphic illustrations of sets of curves helpful in the explanation of the beacon system of this invention.

Referring to Figs. 1A and 1B of the drawing one type of antenna radiation pattern for use with an omni-directional radio beacon is graphically illustrated. The radiation pattern of Fig. 1A is rotated at a constant speed so that a receiver located at any point within range of the transmitter will detect an amplitude variation having sinusoidal characteristics of the signals as shown in Fig. 1B. The sinusoidal characteristics of the pattern shown in Fig. 1B comprise a fundamental and a third harmonic sine wave.

Referring to Fig. 2 of the drawing, one embodiment of an omni-directional beacon system in accordance with the principles of this invention is therein shown to comprise a ground beacon transmitter 1 and a mobile unit receiver 2. A source of carrier frequency energy 3 has its output coupled to a pulser 4 which pulse modulates the source of radio frequency energy 4a at the carrier frequency rate. The pulse modulated radio frequency energy is connected through coupler 5 to the radiating unit 7 of the antenna system 6. The fixed omni-directional radiating unit 7 is shown for purposes of explanation as a single antenna unit, it being understood that if desired a plurality of such units may be vertically stacked to form an antenna array which radiates an increased concentration of energy in the vertical direction. Mounted on disc 8 around the omni-directional radiating unit 7, are a plurality of reflectors 9, 10 and 11. The reflectors 9, 10 and 11 are disposed on disc 8 with a 120° spacing between adjacent reflectors. In order to produce the cardioidal type of radiation pattern having the sinusoidal characteristics of two major lobes 12 and 13 and one minor lobe 14 as shown in Fig. 1A, reflector 9 is located at a greater distance from unit 7 than are reflectors 10 and 11. Motor 15 rotates disc 8, via linkage 16, at a desired speed, for example 30 revolutions per second. Thus, when antenna radiating unit 7 is radiating energy the rotating reflectors 9, 10 and 11 distort the radiated pattern to produce the radiation lobes 12, 13 and 14 shown in Fig. 1A. Reflectors 10 and 11, being closer to the radiating unit 7, produce the major radiation lobes 12 and 13 having greater field strength than the minor lobe 14 produced by reflector 9 which is at a greater distance from the radiating unit 7. Of course it is obvious to those skilled in the art that there are many ways of producing a rotating antenna pattern having an amplitude variation of sinusoidal characteristics and the above description of the antenna system is given only by way of example to illustrate one satisfactory antenna system.

Due to the rotating pattern having sinusoidal amplitude variations, at a remote point the envelope wave 17 of the received pulse modulated radiations varies with a fundamental frequency dependent upon the rotation of the unique lobe 14 or of the fundamental sinusoidal characteristic and with a harmonic frequency dependent upon the rotation of all the lobes 12, 13 and 14 or of the harmonic frequency of the fundamental sinusoidal characteristic. A greater or lesser number of reflectors and various feeder arrangements may be utilized if the radiation of a different number of lobes is desired.

The motor 15 also drives via linkage 18 a disc 19, composed of a non-magnetic material, in synchronism with the rotation of disc 8 and thus in synchronism with the rotation of the antenna radiation pattern. The disc 19 has a slug 20 composed of a magnetic material such as iron, mounted on its rim. Associated with the disc 19 are magnetic pickup units 21 and 22 which serve to provide a triggering pulse each time the magnetic slug 20 passes within the field of the pickup unit. The magnetic slug 20 is so located in the peripheral portion of disc 19 that it passes pickup units 21 and 22 each time the radiation pattern is in a predetermined azimuth. For example slug 20 passes through pickup unit 21 each time the maximum of lobe 14 is aligned with due north and slug 20 passes through pickup unit 22 when the maximum of lobe 14 rotates 180° or is aligned due south. Output energy from magnetic pickup unit 21 is connected through coupler 23 to trigger a source of energy 24 of predetermined frequency, for example 100 kc. The output of energy source 24 is coupled to pulser 4 so that each time the slug 20 on disc 19 passes through pickup unit 21 a burst of pulses at a 100 kc. rate is coupled from R. F. source 4a to the antenna radiator unit 7. In a similar manner the output energy of pickup unit 22 is connected via coupler 25 to a source of energy 26 of a second predetermined frequency such as 200 kc. whose output is connected to pulser 4. Thus each time slug 20 passes through pickup unit 22 a burst of pulses at a 200 kc. rate is connected from R. F. source 4a to antenna radiator unit 7.

Referring to Fig. 1B, the radiations from antenna system 6 received at a predetermined azimuth is shown to comprise a plurality of pulses 27 at the carrier frequency plus a burst of pulses 28 representing a north ("N") reference pulse at the 100 kc. rate plus a burst of pulses 29 representing a south ("S") reference pulse, all amplitude modulated by the antenna system radiation characteristics.

The receiver 2, shown in Fig. 2 of the drawing, provided in a mobile unit, preferably includes a non-directive receiving antenna 30 and the usual front end radio frequency (R. F.) and intermediate frequency (I. F.) circuitry 31 followed by a detector 32 and amplifier 33.

The pulsed output of amplifier 33 includes the bearing envelope wave having a sinusoidal fundamental and harmonic frequency component, derived from the amplitude modulation of the radiated signal and it is fed to a pulse widener circuit 34 and thence to a peak follower circuit 35 in order to reconstruct the envelope wave of the received amplitude modulated pulsed signal. The envelope wave 17 is fed to a fundamental frequency filter 36 whose output is a sine wave at the fundamental frequency of the received radiations having a phase dependent upon the angular position of the receiver 2 with respect to the transmitter 1.

In order to obtain the reference signals to compare with the fundamental frequency component of the bearing envelope wave, the output of the amplifier 33 is coupled to a limiter circuit 37 whose output is fed to a 100 kc. pass filter 38 and a 200 kc. pass filter 39. Each time an "N" reference pulse group is received at the 100 kc. rate the filter 38 couples a pulse to the reference sine wave generator 40 and each time an "S" reference pulse group is received at the 200 kc. rate the filter 39 couples a pulse to the reference signal generator 40. The reference signal sine wave from generator 40 which is synchronized in phase with the reference pulses is coupled to a phase coincidence measuring circuit 41 whose other input comprises the fundamental sine wave component of the bearing envelope wave from filter 36 coupled through phase shifter circuit 42. The phase of the fundamental sine wave of the bearing envelope wave is adjusted by phase shifter 42 until it is in coincidence, as shown by circuit 41, with the reference sine wave from generator 40 and the phase adjustment necessary to produce coincidence is indicative of the azimuth of the receiver 2 from the transmitter 1.

In omni-directional beacon systems heretofore known only a single reference pulse was utilized for each 360 electrical degrees of the bearing signal. Thus as shown in Fig. 1B if a high level of noise is present at the receiver location as shown by dotted line 43 and the receiver is situated in a direction corresponding to the minimum of the modulation cycle when the "N" pulse is received it is quite probable that the reference signal 28 will be obscured by the noise level. However by the addition of a second reference signal 29, 180° out of phase with the first reference signal 28 the receiver is assured of detecting at least one of the reference signals 28 or 29.

Referring to Fig. 3 of the drawing one embodiment of a reference wave generator 40 for use in the receiver 2 of the mobile unit is shown. The two separated "N" and "S" reference pulses from filters 38 and 39 are applied to the grids of a pair of electron discharge devices 43 and 44 which function as a push-pull circuit. Either one or both of the reference signals are coupled via transformer 45 to the sine wave generator 46. The polarity of the signal coupled via transformer 45 indicates whether the reference signal is "N" or "S" and thus the frequency of the output of the sine wave generator 46 can be synchronized with the frequency of either one or both of the reference signals. In order to ensure that the output of the sine wave generator 46 is absolutely synchronized in phase with the reference signals, the sine wave of proper frequency from generator 46 is coupled to the grid of electron discharge device 47 via line 48 after being passed through a phase shifter 49. The output from the plate of tube 47 is coupled to a pair of rectifying diodes 50a and 50b over two paths 51a and 51b, each of the paths including a blocking condenser 52a and 52b. Obviously only the positive portion 53 of the sine wave input to tube 47 will be conducted by diode 50a while the negative portion 54 will be conducted by diode 50b. The output of the diodes 50a and 50b are coupled past an integrating circuit 55 comprising a resistance 56 and capacitor 57 to line 58. Due to the action of integrator circuit 55 when the currents passed by the diodes 50a and 50b are equal, no voltage is coupled to line 58 since the positive and negative portions of the input signal cancel out.

The detected reference signals are also applied to the grid of a gas discharge device 59 which produces an output pulse each time a reference signal is applied to its grid. The output pulses from tube 59 are coupled to the series connected primaries of plate transformers 60 and 61. The transformers 60 and 61 are so constructed that each time a pulse is coupled to their primary windings the pulse output of the secondary winding of transformer 60 is negative when coupled to the cathode of diode 50b while the output of the secondary winding of transformer 61 is positive when coupled to the plate of diode 50a. Thus both diodes will pass each pulse received but they will be of opposite polarity.

Figs. 4 and 5 of the drawing illustrate sets of curves helpful in explaining the operation of the reference wave generator of Fig. 3. Fig. 4, curve A shows the sine wave coupled from generator 46 to the grid of tube 47. Positive portion 53 is passed by diode 50a while negative portion 54 is passed by diode 50b. Fig. 4, curve B represents the input reference pulses to tube 59 when the sine wave of curve A is in synchronism with the reference pulses in phase and frequency. Due to the synchronization which occurs in generator 46 the first pulse 62 represents the "N" reference signal while the second pulse 63 represents the "S" reference signal. Since each pulse is passed by both diodes 50a and 50b the output of the diodes due to the reference pulses is shown in curve C. The combined output of diodes 50a and 50b due to the sine wave and the reference pulses is shown in curve D. Since the reference signals and the sine wave were synchronized in phase and frequency the areas above and below the zero level of curve D are equal and therefore after integration due to circuit 55 the output coupled to line 58 will be zero.

The curves of Fig. 5 illustrate the condition when the sine wave from generator 46 shown in curve A is out of phase with the reference signal input to tube 59 shown in curve B. Fig. 5, curve C shows the output of diodes 50a and 50b due to the reference signal input. Fig. 5, curve D shows the output of diodes 50a and 50b resulting from the combined input of the sine wave of curve A and the passed pulses of curve C. Since the two inputs are out of phase it is apparent that the area above the zero level during the positive portion of the sine wave is greater than the area under the zero level during the positive portion of the sine wave. After integration in circuit 55 a D. C. error voltage results which is coupled to phase shifter 49 to vary the phase of the output of generator 46. During the negative portion of the sine wave a net error voltage of the opposite sign is coupled via line 58 to phase shifter 49. The error voltages tend to control the phase shifter 49 to cause the output of generator 46 passed by the phase shifter 49 to be in phase with the reference signals. For this purpose the phase shifter 49 may be any form of phase modulator such as, for example, the phase modulators appearing on page 135 (Fig. 7-6), page 144 (Fig. 7-16), page 145 (Fig. 7-18), page 147 (Fig. 7-20) of Nathan Marchand's text on "Frequency Modulation," published by Murray Hill Books, Inc., copyrighted 1948. Obviously if only one reference signal is being received, regardless whether it be the "N" or "S" signal the error voltage will be generated to cause a phase synchronism in the output of the phase generator 49 between the sine wave and the reference signal.

It is of course apparent to those skilled in the art that the principles of this invention are applicable to systems utilizing harmonic reference signals such as shown in copending application Serial Number 369,075, filed July 20, 1953, and assigned to the same assignee as this application.

While I have described above the principles of my invention in connection with specific apparatus, it is to be clearly understood that this description is made only by way of example and not as a limitation to the scope of my invention as set forth in the objects thereof and in the accompanying claims.

I claim:
1. A radio beacon system comprising a source of radio frequency energy, means for pulse modulating said radio frequency energy, means for amplitude modulating said pulse modulated energy, means for radiating said amplitude modulated energy to form a directional radiation pattern, means for rotating said directional pattern at a predetermined rate whereby at least one sinusoid is generated for each rotation of said pattern, means for generating a plurality of pulsed reference signals for said sinusoid and means for radiating said reference signals in synchronism with the rotation of said pattern in a plurality of radial directions.

2. A radio beacon system according to claim 1 wherein said means for generating a plurality of pulsed reference signals includes a plurality of sources of energy each having a distinct radio frequency and means responsive to said means for rotating said pattern to pulse modulate said distinct radio frequency sources.

3. An aerial navigation system comprising a beacon including a source of radio frequency energy, means for amplitude modulating said energy, means for radiating said modulated energy to form a directional radiation pattern, means for rotating said directional pattern at a predetermined rate whereby at least one amplitude modulated sinusoid is generated for each rotation of said pattern, means for generating a plurality of reference signals for said sinusoid and means for radiating said reference signals in synchronism with the rotation of said pattern in a plurality of radial directions; a receiver at a remote point for receiving the signal radiations of said beacon including means to detect the envelope wave of said radiated modulated energy, means for detecting said radiated reference signals, means responsive to said detected reference signals to generate a reference wave for said sinusoid, and phase comparator means for comparing the phase of said reference wave with the phase of said detected envelope wave.

4. An aerial navigation system comprising a beacon including a source of radio frequency energy, means for amplitude modulating said energy, means for radiating said modulated energy to form a directional radiation pattern, means for rotating said directional pattern at a predetermined rate whereby at least one sinusoid is generated for each rotation of said pattern, means for generating a plurality of reference signals for said sinusoid and means for radiating said reference signals in synchronism with the rotation of said pattern in a plurality of radial directions; a receiver at a remote point for receiving the signal radiations of said beacon including means to detect the envelope wave of said radiated modulated energy, means for detecting said radiated reference signals, means to compare the phase of said detected envelope wave with the time of occurrence of any one of said detected reference signals.

5. An aerial navigation system comprising a beacon including a source of radio frequency energy, means for pulse modulating said radio frequency energy, means for amplitude modulating said pulse modulated energy, means for radiating said amplitude modulated energy to form a directional radiation pattern, means for rotating said directional pattern at a predetermined rate whereby at least one sinusoid is generated for each rotation of said pattern, a plurality of sources of energy each having a distinct radio frequency, means responsive to said means for rotating said pattern to pulse modulate said distinct radio frequency sources to provide a plurality of pulsed reference signals for said sinusoid and means for radiating said reference signals in synchronism with the rotation of said pattern in a plurality of radial directions, a receiver at a remote point for receiving the signal radiations of said beacon including means to detect the envelope wave of said radiated modulated energy, filter means for detecting said radiated reference signals, means responsive to said detected reference signals to generate a reference wave for said sinusoid, and phase comparator means for comparing the phase of said reference wave with the phase of said detected envelope wave.

6. A direction indicating receiver to cooperate with a beacon at a remote location which emits a rotating directional energy radiation pattern of sinusoidal characteristics, at least one sinusoid being generated for each rotation of said pattern and a plurality of reference signals for each sinusoid in synchronism with the rotation of said pattern in a plurality of radial directions, comprising means to detect the envelope wave of said radiated modulated energy, means for detecting said radiated reference signals, means to separate said detected reference signals in accordance with the said radial direction, means responsive to at least one of said separated reference signals to generate a sinusoidal reference wave having a frequency substantially equal to the frequency of said separated reference signals, and means responsive to the timing of said detected reference signals to adjust the phase of said reference wave and phase comparator means for comparing the phase of said reference wave with the phase of said detected envelope wave.

7. A direction indicating receiver to cooperate with a beacon at a remote location which emits a rotating directional energy radiation pattern of sinusoidal characteristics, at least one sinusoid being generated for each rotation of said pattern and a plurality of reference signals for each sinusoid in synchronism with the rotation of said pattern in a plurality of radial directions, comprising means to detect the envelope wave of said radiated modulated energy, means for detecting said radiated reference signals, means to separate said detected reference signals in accordance with the said radial direction, means responsive to at least one of said separated reference signals to generate a sinusoidal reference wave having a frequency substantially equal to the frequency of said separated reference signals, phase comparison means to compare the phase of said sinusoidal reference wave and said reference signals, means to generate an error signal responsive to the output of said first comparison means, means to adjust the phase of the first of said sinusoidal reference waves responsive to said error signal and second comparison means for comparing the phase of said adjusted sinusoidal reference wave with the phase of said detected envelope wave.

8. A direction indicating receiver to cooperate with a beacon at a remote location which emits a rotating directional energy radiation pattern of sinusoidal characteristics, at least one sinusoid being generated for each rotation of said pattern and a plurality of reference signals for each sinusoid in synchronism with the rotation of said pattern in a plurality of radial directions, comprising means to detect the envelope wave of said radiated modulated energy, means for detecting said radiated reference signals, means to separate said detected reference signals in accordance with the said radial direction, means responsive to at least one of said separated reference signals to generate a sinusoidal reference wave having a frequency substantially equal to the frequency of said separated reference signals, a full wave rectifier, means to couple said sinusoidal reference wave to said rectifier, means to couple said detected reference signals to said rectifier, an integrator circuit coupled to the output of said rectifier whereby the output signal across said integrator circuit is indicative of the difference in phase between said sinusoidal reference wave and said detected reference signal, and means to adjust the phase of said sinusoidal reference wave responsive to said error signal and phase comparison means for comparing the phase of said reference wave with the phase of said detected envelope wave.

9. An aerial navigation system comprising a beacon including a source of radio frequency energy, means for pulse modulating said radio frequency energy, means for amplitude modulating said pulse modulated energy with at least one sinusoidal characteristic, means for radiating said amplitude modulated energy to form a directional radiation pattern, means for rotating said directional pattern at a predetermined rate whereby at least one sinusoid is generated for each rotation of said pattern, a plurality of sources of energy each having a distinct radio frequency, means responsive to said means for rotating said pattern to pulse modulate said distinct radio frequency sources to provide a plurality of pulsed reference signals for each of said sinusoids and means for radiating said reference signals in synchronism with the rotation of said pattern in a plurality of radial directions, a receiver at a remote point for receiving the signal radiations of said beacon including means to detect the envelope wave of said radiated modulated energy, means for detecting said radiated reference signals, means to separate said detected reference signals in accordance with the said radial direction, means responsive to at least one of said separated reference signals to generate a sinusoidal reference wave having a frequency substantially equal to the frequency of said separated reference signals, a full wave rectifier, means to couple said sinusoidal reference wave to said rectifier, means to couple said detected reference signals to said rectifier, an integrator circuit coupled to the output of said rectifier whereby the output signal across said integrator circuit is indicative of the difference in phase between said sinusoidal reference wave and said detected reference signal, and means to adjust the phase of said sinusoidal reference wave responsive to said error signal and phase comparison means for comparing the phase of said reference wave with the phase of said detected envelope wave.

10. A radio navigation system beacon to cooperate with a receiver at a given azimuth comprising a source of radio frequency energy, means for radiating said energy in a directional radiation pattern, means for rotating said directional radiation pattern at a predetermined rate to cause at said receiver a detectable bearing signal wave having a fundamental frequency, means for radiating a first reference signal having a phase difference relative to said bearing signal dependent upon the azimuth of said receiver to said beacon, means for radiating at least a second reference signal having characteristics distinguishing it from said first reference signal and having a phase difference relative to said bearing signal dependent upon the azimuth of said receiver to said beacon, the said phase differences of each of said reference signals relative to said bearing signal being characterized in that each phase difference changes a like amount when said signals are received at another azimuth.

11. A radio navigation system beacon to cooperate with a receiver at a given azimuth comprising a source of radio frequency energy, means for amplitude modulating said energy to form a directional radiation pattern, means for rotating said directional radiation pattern at a predetrmined rate to cause at said receiver a detectable amplitude modulated bearing signal wave having a given frequency, means for radiating a first pulsed reference signal at said given frequency and having a phase difference relative to said bearing signal dependent upon the given azimuth of said receiver to said beacon, means for radiating at least a second pulsed reference signal at said given frequency and having energy characteristics distinguishing it from said first pulsed reference signal and having a phase difference relative to said bearing signal dependent upon the given azimuth of said receiver to said beacon, the said phase differences of each of said reference signals relative to said bearing signals being characterized in that each of said phase differences changes a like amount when said signals are received at a second azimuth different from said given azimuth.

12. A radio navigation system beacon to cooperate with a receiver at a given azimuth comprising a source of radio frequency energy, means to pulse modulate said energy, means for radiating said energy in a directional radiation pattern, means for rotating said pulse modulated directional radiation pattern at a predetermined rate to cause at said receiver a detectable amplitude modulated bearing signal envelope wave having a fundamental frequency, means for radiating a first pulsed reference signal having a a phase difference relative to said bearing signal dependent upon the given azimuth of said receiver to said beacon, means for radiating a second pulsed reference signal having energy characteristics distinguishing it from said first pulsed reference signal and having a phase difference relative to said bearing signal envelope wave dependent upon the given azimuth of said receiver to said beacon, the said phase differences of each of said reference signals relative to said bearing signal envelope wave being characterized in that each of said phase differences changes a like amount when said signals are received at an azimuth different from said given azimuth.

References Cited in the file of this patent

UNITED STATES PATENTS

| | | |
|---|---|---|
| 2,531,918 | O'Brien | Nov. 28, 1950 |
| 2,564,703 | Litchford et al. | Aug. 21, 1951 |
| 2,572,041 | Litchford et al. | Oct. 23, 1951 |